Nov. 24, 1936.  E. E. HEWITT  2,061,904
AIR STRAINER DEVICE
Filed Jan. 31, 1935
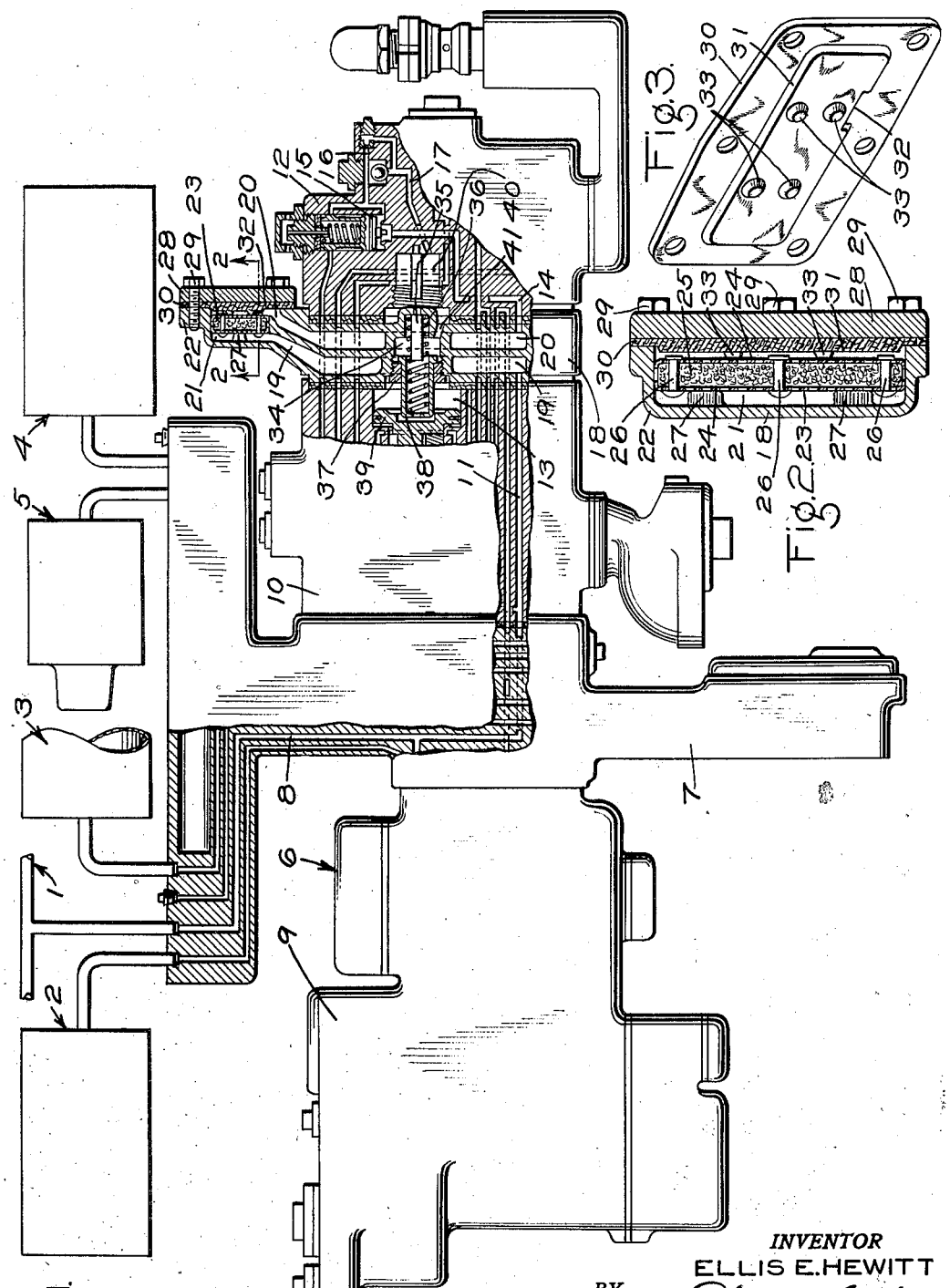
INVENTOR
ELLIS E. HEWITT
BY
*Wm. M. Cady*
ATTORNEY Patented Nov. 24, 1936

2,061,904

UNITED STATES PATENT OFFICE 2,061,904

AIR STRAINER DEVICE

Ellis E. Hewitt, Edgewood, Pa., assignor to The Westinghouse Air Brake Company, Wilmerding, Pa., a corporation of Pennsylvania Application January 31, 1935, Serial No. 4,264

6 Claims. (Cl. 303—88)

This invention relates to fluid pressure brake controlling valve devices and more particularly to a type now employed in railway service and known as the "universal" brake controlling valve device.

The usual type of universal brake controlling valve device comprises a pipe bracket, an equalizing portion, an emergency portion and a high pressure portion or cap. A large number of such valve devices are now in use in which a strainer is employed for cleaning fluid supplied from the brake pipe to the equalizing portion and in which there is no such strainer employed for cleaning fluid supplied from the brake pipe to the emergency portion. Quite recently it has been proposed to interpose a strainer in the communication between the brake pipe and emergency portion. On some railroads it is desired to employ a strainer in this communication while on others it is not and the principal object of the present invention is to provide a strainer device which is adapted to be clamped between the casing of the emergency portion and the high pressure cap and which is adapted to clean fluid which may flow from the brake pipe to the emergency portion.

According to this object a strainer may be interposed in the communication between the brake pipe and emergency portion without having to provide a new casing for the emergency portion or a new high pressure cap in case the strainer is to be applied to old equipment and without having to provide two different types of casings for the emergency portion or two different types of high pressure caps in new equipments to meet the aforementioned different requirements of the railroads.

Another object of the invention is to provide a strainer device comprising a casing which is adapted to be clamped between the emergency portion and the high pressure cap of a universal valve device and which is provided with a passage through which brake pipe fluid is adapted to flow to the emergency portion and comprising a removable strainer interposed in said passage and accessible from the exterior of the casing to facilitate the cleaning or replacement of the strainer. Another feature resides in the novel construction for securely clamping the strainer to the casing of the strainer device.

Other objects and advantages will appear in the following more detailed description of the invention.

In the accompanying drawing Fig. 1 is a side elevational view, partly in section, of a universal valve device with the strainer device associated therewith; Fig. 2 is a cross-sectional view through the strainer device on the line 2—2 of Fig. 1 and Fig. 3 is a perspective view of a gasket of the strainer device.

In the drawing a fluid pressure brake equipment is illustrated which comprises a brake pipe 1, an auxiliary reservoir 2, a service reservoir 3, an emergency reservoir 4, a brake cylinder 5 and a universal valve device 6.

The universal valve device 6 may be of the usual well known construction comprising a pipe bracket 7 having a passage 8 to which the brake pipe 1 is connected, an equalizing portion 9 clamped to one side of the pipe bracket, an emergency portion 10 clamped to the opposite side of the bracket and having a passage 11 which is in registration with the passage 8, and also comprises a high pressure cap 12 which, when a strainer for the emergency portion is not desired, is secured directly to the emergency portion. With the high pressure cap thus secured to the emergency portion, fluid under pressure supplied to the brake pipe 1 is adapted to flow therefrom to the emergency piston chamber 13 by way of passages 8 and 11, a passage 14 in the high pressure cap 12, past the usual protection valve 15, a choked passage 16, a passage 17 and a recess 40 in which may be contained the usual spring-pressed stop for the emergency piston 39.

When a strainer for the emergency portion is desired a filler piece or strainer device 18 is clamped between the emergency portion 10 and the high pressure cap 12. The strainer device comprises a casing having passages 19 and 20 which are connected together by a chamber 21 which is formed in a portion 22 of the casing extending some distance outwardly beyond the outer surfaces of the emergency portion and high pressure cap as shown in Fig. 1. With the strainer device secured in position, the passage 19 is in open communication with the brake pipe passage 11 in the emergency portion and the passage 20 is in open communication with the passage 14 in the high pressure cap.

Contained in the chamber 21 is a strainer 23 through which fluid supplied to the passage 19 flows to the passage 20 and since the only communication between the passages 19 and 20 is by way of the strainer, fluid flowing to the passage 20 will have been cleansed of any foreign matter which it may have carried to the strainer. The strainer may be of any desired construction, but as shown in the drawing preferably comprises spaced metallic members 24 which are provided with a sufficient number of openings to permit the free flow of fluid past the members and packed in the space between the members is a suitable fluid cleansing medium 25 such as curled hair. The members 24 are held against spreading by means of rivets 26, but are permitted to move toward each other to compensate for any slight manufacturing inaccuracies in the means, hereinafter described, which are employed for securely holding the strainer in position in the casing.

The chamber 21 is open at one side and the strainer 23 is adapted to be inserted in the chamber through this open side. The peripheral edges of the strainer snugly engage the walls of the opening so as to prevent any appreciable leakage of uncleaned fluid past the strainer.

When the strainer is properly positioned in the chamber 21, one of the members 24 is engaged by spaced lugs 27 which extend inwardly from the back wall of the chamber. These lugs are preferably integral with said wall and are for the purpose of maintaining the strainer spaced from the wall.

After the strainer has thus been positioned in the casing, the open end of the chamber is closed by a cover plate 28 which is secured to the casing by means of bolts 29 or any other desired means which will permit the ready removal and replacement of the cover plate. Clamped between the casing and the cover plate 28 is a gasket 30 which prevents leakage of fluid from the chamber 21. This gasket is provided with a raised portion 31 which extends inwardly toward the strainer and is provided with a notch 32 to prevent the raised portion from restricting the flow of fluid from the chamber 21 to the passage 20. Extending inwardly from the raised portion and preferably integral therewith are a plurality of projections 33 of small diameter which contact with the adjacent strainer member 24. The gasket is made of rubber composition and by providing the raised portion 31 the projections 33 are shorter and of less diameter than would otherwise be the case to obtain the desired rigidity of the projections. By thus keeping the diameter of the projections to a minimum they will not act to materially retard the flow of fluid through the strainer as projections of larger diameter would do. It will be seen that with one side of the strainer in contact with the lugs 27 and the other side in contact with the projection 33, the strainer will be securely held in its proper position in the casing. If either the lugs 27 or the projections 33 or both should be slightly too long, the strainer members, being free to move toward each other, will compensate for any such inaccuracies.

The casing of the strainer device is provided with a central recess 34 containing a spring centering pin or projection 35 and a spring 36. Slidably mounted in a nut 37 having screw threaded connection with the casing within the recess 34 is an emergency piston stop 38 which is subject to the action of the spring 36 and which is limited in its movement in the direction toward the emergency piston 39 by the engagement of a flange thereof with the nut 37. The recess 34 is connected through a passage 41 with the recess 40, the recess 34 being open to the emergency piston chamber in the usual manner.

From the foregoing description it will be apparent that with the strainer device secured in place between the emergency portion 10 and the high pressure cap 12, fluid under pressure supplied to the brake pipe 1 flows to the recess 34 in the strainer device and consequently to the emergency piston chamber 13 by way of passages 8, 11 and 19, strainer chamber 21, strainer 23, passages 20 and 14, past the protection valve 15, choked passage 16, passage 17, recess 40, and passage 41. It will thus be seen that the fluid flowing to the emergency piston chamber is cleaned of any foreign matter which it may have been carrying.

The emergency piston stop 38, stop spring 36 and stop nut 37 are identical with those mounted in the recess 40 when the high pressure cap is to be secured directly to the emergency portion 10 so that if a strainer device 18 is to be applied to a universal valve device which has been assembled, these parts may be removed from the high pressure cap and mounted in the strainer device instead of discarding them, which of course results in a material saving.

From the foregoing description it will be understood that the bolts 29, cover plate 28, gasket 30 and strainer 23 of the strainer device 18 may be easily removed from the casing for cleaning or repair purposes and also replaced without interference by any part of the emergency portion or high pressure cap or without disturbing said portion or cap.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake controlling valve device, in combination, a casing having a piston chamber to which fluid under pressure is adapted to be supplied and having a fluid supply passage, a cap for said valve device having a supply communication leading to said piston chamber, a strainer device separate from but interposed between and secured to said casing and cap and having a communication connecting said supply passage and supply communication, and a strainer included in the strainer device and interposed in the connecting communication.

2. In a brake controlling valve device, in combination, a casing having a piston chamber to which fluid under pressure is adapted to be supplied and having a fluid supply passage, a cap for said valve device having a supply communication leading to said piston chamber, a strainer device clamped between said casing and cap and having a communication connecting said supply passage and supply communication, a strainer interposed in the connecting communication, and a removable plate for rendering the strainer accessible from the exterior of the strainer device.

3. In a brake controlling valve device, in combination, a casing having a piston chamber to which fluid under pressure is adapted to be supplied and having a fluid supply passage, a cap for said valve device having a supply communication leading to said piston chamber, a strainer device clamped between said casing and cap and having a communication connecting said supply passage and supply communication, a strainer interposed in the connecting communication, in a vertical plane beyond the vertical plane of the outer surface of the cap, and a removable plate for rendering the strainer accessible from the exterior of the strainer device without interference by the cap.

4. In a brake controlling valve device, in combination, a casing having an emergency piston chamber containing an emergency piston and to which fluid under pressure is adapted to be supplied and having a fluid supply passage, a cap for said valve device having a recess for the reception of an emergency piston stop mechanism and having a supply communication leading to said recess, a strainer device clamped between said cap and casing and having a communication connecting said supply passage and supply communication and having a central recess in open communication with the piston chamber and with the first mentioned recess, a stop mechanism for said piston contained in the recess in the strainer device, and a strainer interposed in the connecting communication of the strainer device.

5. In a brake controlling valve device, in combination, a valve body having a control chamber to which fluid under pressure is adapted to be supplied and having a fluid supply passage, a cap for said valve device having a supply communication leading to said chamber, a strainer device comprising a casing separate from but interposed between and secured to said valve body and cap and having a communication connecting said supply passage and supply communication, a strainer interposed in the communication in said casing, a lug on the casing adapted to engage one side of the strainer to space the strainer from the casing, a gasket having a projection adapted to engage the opposite side of the strainer, a plate for clamping said gasket to the casing, and means for removably securing said plate and gasket to the casing, said plate and strainer being removable from the casing without interference by the valve body or cap.

6. In a brake controlling valve device, in combination, a valve casing having a control chamber to which fluid under pressure is adapted to be supplied and having a fluid supply passage, a cap for said valve device having a supply communication leading to said chamber, a strainer device comprising a casing separate from but interposed between and secured to said valve body and cap and having a communication connecting said passage and supply communication, said casing having an open ended recess communicating with the connecting communication therein, a strainer contained in said recess through which fluid flowing through the connecting communication must pass, a lug on said casing engaging one side of said strainer for spacing the strainer from the casing, a member of rubber composition having projections adapted to engage the opposite side of the strainer and force the strainer in close contact with said lug, and means for securing said member to the casing, said means and member when secured to the casing closing the open end of the recess and being accessible for removal and replacement without interference by said valve body and cap.

ELLIS E. HEWITT.